Patented Aug. 18, 1953

2,649,450

UNITED STATES PATENT OFFICE 2,649,450

PREPARATION OF 1,4-DIALKYL-2-KETOPIPERAZINES

James S. Strong and W E Craig, Philadelphia, and Vincent T. Elkind, Roslyn, Pa., assignors to Rohm & Haas Company, Philadelphia, Pa., a corporation of Delaware No Drawing. Application February 8, 1952, Serial No. 270,762

5 Claims. (Cl. 260—268)

This invention deals with a method for the preparation of ketopiperazines of the formula

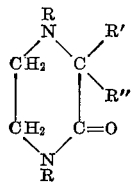

wherein R is a lower alkyl group, particularly a methyl group, R' is hydrogen, a phenyl group, a furfuryl or tetrahydrofurfuryl group, or an alkyl group of not over eight carbon atoms, and R'' is hydrogen or a methyl group, or R' and R'' together form an alkylene chain which with the carbon atom to which the chain is attached forms a carbocycle.

The process of this invention comprises reacting a carbonyl compound, R'R''CO, hydrogen cyanide, and an ethylenediamine of the formula RNHCH$_2$CH$_2$NHR, heating the reaction mixture thereof in the presence of water at a temperature of at least 90° C., ammonia being evolved, and separating a 1,3-dialkyl-2-ketopiperazine. The exact order in which the above starting materials are combined or reacted is not critical. Thus, a said diamine, carbonyl compound, and hydrogen cyanide may be reacted together in the presence of water and the desired 1,4-dialkyl-2-ketopiperazine separated. Or, carbonyl compound and hydrogen cyanide may be reacted to give a cyanohydrin which is then reacted with an N,N'-dialkylethylenediamine in the presence of water. Again, a dialkylethylenediamine may be reacted with a carbonyl compound to form an imidazolidine and water and this reaction mixture is then reacted with hydrogen cyanide to give the 1,4-dialkyl-2-ketopiperazine.

The products find use in medicinal, textile, pesticidal, and resin chemistry.

The reactants are brought together at any convenient temperature between 0° and 90° C. At some stage in the reaction, including a stage in which products are separated by distillation, the temperature is carried to at least 90° C. The reaction mixture may be heated from 90° up to a temperature of about 170° C. or even higher to complete the reaction and/or separate the product.

The products are for the most part separable from the reaction mixture through distillation under reduced pressure. The products may often be purified by crystallization.

As useful diamines there may be mentioned N,N-dimethylethylenediamine, N,N'-diethylethylenediamine, N,N'-dibutylethylenediamines, or the like. The compound N,N'-dimethylethylenediamine is of chief interest.

The carbonyl compounds include both aldehydes and ketones and for the most part may be defined by the formula R'R''CO, where R' and R'' represent the groups stated above. Examples of specific compounds are formaldehyde, acetaldehyde, propionaldehyde, butyraldehyde, isobutyraldehyde, valeraldehyde, 2-ethylhexylaldehyde, octylaldehyde, 3,5,5-trimethylhexylaldehyde, and other nonylaldehydes, benzaldehyde, chlorobenzaldehyde, butylbenzaldehyde, methoxybenzaldehyde, furfuraldehyde, tetrahydrofurfuraldehyde, acetone, methyl ethyl ketone, methyl butyl ketone, methyl octyl ketone, acetophenone, chloroacetophenone, alkylphenyl methyl ketones, phenyl ethyl ketone, cyclopentanone, cyclohexanone, methylcyclohexanone, chlorocyclohexanone, and the like.

Typical preparations are given in the following illustrative examples. The parts are by weight.

Example 1

There were mixed 176 parts of sym.-dimethylethylenediamine, 127.5 parts of acetone cyanohydrin, and 250 parts of water. This mixture was heated at 50°–55° C. for 2.5 hours and then for four hours at 90° C. The reaction mixture was then left standing for 16 hours. It was subjected to distillation. The fraction obtained at 113°–118° C./17 mm. amounted to 185 parts and was 1,3,3,4 - tetramethyl-2-ketopiperazine. By analysis the product contained 18.4% of nitrogen, 60.7% of carbon, and 11.0% of hydrogen. Theoretical values are 18.0%, 61.3%, and 10.3%, respectively.

Example 2

There were mixed 72 parts of isobutyraldehyde, and 12 parts of sym.-dimethylethylenediamine. To this mixture was added a solution of 30 parts of hydrogen cyanide in 80 parts of water. During the addition the temperature of the mixture was maintained below 26° C. by cooling. There was then added additional sym.-dimethylethylenediamine in an amount of 120 parts, all parts being by weight. The reaction mixture was stirred for 20 hours at 30° C. and after the addition of 50 parts of water heated to 103° C. for 1.5 hours. By this time a two layer system had formed. To produce a homogeneous system addition was made of 40 parts of isopropyl alcohol, The mixture was left standing for 24 hours and then addition was made of 25 parts of water. The mixture was then distilled. At 113°–116° C./10 mm. a fraction of 115.5 parts of 1,4-dimethyl-3-isopropyl-2-ketopiperazine was obtained. This distillate contained by analysis 17% of nitrogen, 61% of carbon, and 10.2% of hydrogen. Corresponding theoretical values are 16.5%, 63.5%, and 10.6%, respectively.

Example 3

A solution of 15 parts of hydrogen cyanide in 51 parts of water was added to 51 parts of N,N'-dimethylimidazolidine with the temperature of the mixture kept below 36° C. The mixture was left standing for 20 hours, after which time 36 parts of water were added and the resulting mixture was allowed to stand for 40 hours. The reaction mixture was then distilled with removal of water and volatile components at normal pressure and distillation of product under reduced pressure. At 109°–114° C./13 mm. a fraction of 56 parts was taken off. This corresponded in composition to 1,4-dimethyl-2-ketopiperazine. It contained by analysis 21.9% of nitrogen, 56.14% of carbon, and 9.36% of hydrogen. Theoretical values are 21.9%, 56.2%, and 9.38%, respectively.

Example 4

To 98 parts of cyclohexanone were added 5 parts of sym.-dimethylethylenediamine and a solution of 30 parts of hydrogen cyanide in 15 parts of water, while the temperature was kept below 20° C. There were then added 85 parts of water, 117 parts of sym.-dimethylethylenediamine, and 67 parts of isopropyl alcohol. The resulting mixture was heated at 90° C. for 27 hours. The mixture was then set aside without heating. Upon examination 16 hours later it was found the crystallization had occurred. The crystals were separated by filtration and washed with 50% aqueous isopropyl alcohol. The filtrate was distilled. At 155°–160° C./10 mm. there was obtained the compound

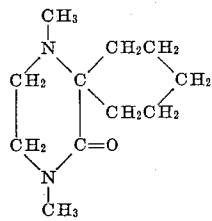

A very similar compound is obtained from cyclopentanone.

Example 5

Two parts of N,N'-dimethylethylenediamine were added to 105 parts of p-chloroacetophenone and with the temperature of this material at 30° C. there was added thereto a solution of 20 parts of hydrogen cyanide in 20 parts of water. There were then added 88 parts of the same diamine and 50 parts of water. The mixture was stirred for a half hour and was then heated to 96° C. An addition of 40 parts of isopropyl alcohol was made and heating was continued under reflux for 24 hours. The reaction mixture was distilled. At 157°–187° C./1.5–2 mm. a fraction was taken which was identified as 1,3,4-trimethyl-3-p-chlorophenyl-2-ketopiperazine.

Example 6

A solution of 30 parts of hydrogen cyanide in 30 parts of water was added to a mixture of 11.7 parts of sym.-dimethylethylenediamine, 96 parts of furfural, and 200 parts of water with the temperature of the mixture held below 30° C. The mixture was stirred for 1.5 hours with the temperature between 20° and 25° C. The mixture was then heated to 95° C. for five hours. It was distilled. The product was taken in a fraction at 145°–157° C./10 mm. This was redistilled at 178°–184° C./15 mm. The material thus obtained contained by analysis 14.4% of nitrogen, 61.8% of carbon, and 7.2% of hydrogen, thus corresponding in composition to 1,4-dimethyl-3-furyl-2-ketopiperazine, for which the corresponding theoretical values are 14.5%, 62.7%, and 7.0%, respectively.

Example 7

There was added to 44 parts of 1,3-dimethyl-2-phenylimidazolidine a solution of 8.1 parts of hydrogen cyanide in five parts of water with the temperature of the mixture maintained below 25 C. The above 2-phenylimidazolidine had been prepared by a known method from benzaldehyde and sym.-dimethylethylenediamine.

The above mixture was stirred for an hour at room temperature and slowly heated to 95° C. at which level heating was continued for five hours. The mixture was then distilled. At 155°–165° C./1 mm. a fraction of 21 parts of 1,4-dimethyl-3-phenyl-2-ketopiperazine was obtained. It contained by analysis 13.7% of nitrogen, 70.3% of carbon, and 8.0% of hydrogen. Corresponding theoretical values are 13.7%, 70.5%, and 7.84%, respectively.

Example 8

To 117 parts of sym.-dimethylethylenediamine and 150 parts of water there was added nonylaldehyde cyanohydrin in an amount of 169 parts. This cyanohydrin has the structure

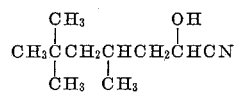

The mixture was heated under reflux for eight hours with a slow evolution of ammonia. The mixture was then distilled. The product came over between 135° and 165° C. under 0.4 mm. pressure and 165°–175° C. under 0.7 mm. pressure. The main fraction was taken at 150°–165° C./0.4 It contained by analysis 11.7% of nitrogen. The theoretical nitrogen content of the product, 1,4-dimethyl-3-octyl-2-ketopiperazine, is 11.7%.

Example 9

A portion of 58 parts of N,N'-dimethylenediamine was added to 98 parts of cyclohexanone. To this mixture was added a solution of 30 parts of hydrogen cyanide in 15 parts of water, while the temperature of the mixture was held below 30° C. Then 50 parts of water and 59 parts of N,N'-dimethylethylenediamine were added, followed by addition of 85 parts of isopropyl alcohol. The resulting mixture was heated under reflux for 27 hours. When the mixture was cooled, a crystalline material formed. It was filtered off and the filtrate was distilled. The fraction taken at 155°–160° C./10 mm. was the desired product,

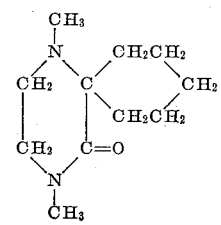

By generally similar methods there may be used as starting materials other ketones and other aldehydes, as defined by the formula R'R''CO. In place of the symmetrical dimethylethylenediamine there may be used the homologous diethyl, dipropyl, or dibutyl N,N'-substituted ethylenediamines, although yields fall off as the size of the substituent groups increases.

We claim:

1. A process for preparing a ketopiperazine of the formula

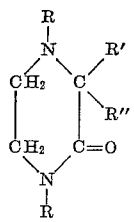

which comprises reacting a diamine of the formula RNHCH$_2$CH$_2$NHR, a compound of the formula R'R''CO, and hydrogen cyanide in the presence of water and heating the mixture thereof to at least 90° C., in the above formulae R being an alkyl group of not over four carbon atoms, R' being a member of the class consisting of hydrogen, phenyl groups, the furfuryl group, and alkyl groups of not over eight carbon atoms, and R'' being a member of the class consisting of hydrogen and the methyl group, when R' and R'' are individual groups, and when R' and R'' are taken together, they form an alkylene chain of four to five carbon atoms which with the carbon atom to which this chain is attached forms a carbocycle.

2. A process for preparing 1,4-dimethyl-2-ketopiperazines of the formula

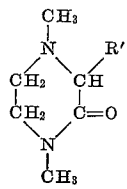

which comprises reacting N,N'-dimethylethylenediamine, an aldehyde of the formula R'CHO, and hydrogen cyanide in the presence of water and heating the reaction mixture thereof to at least 90° C., R' being an alkyl group of not over eight carbon atoms.

3. A process for preparing a 1,4-dimethyl-2-ketopiperazine of the formula

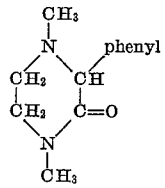

which comprises reacting N,N'-dimethylethylenediamine, a benzaldehyde, and hydrogen cyanide in the presence of water and heating the reaction mixture to at least 90° C.

4. A process for preparing 1,4-dimethyl-3-furfuryl-2-ketopiperazine which comprises reacting N,N' - dimethylethylenediamine, furfuraldehyde, and hydrogen cyanide in the presence of water and heating the reaction mixture to at least 90° C.

5. A process for preparing a ketopiperazine of the formula

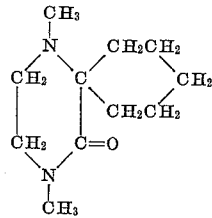

which comprises reacting N,N'-dimethylethylenediamine, cyclohexanone, and hydrogen cyanide in the presence of water and heating the reaction mixture to at least 90° C.

JAMES S. STRONG.
W E CRAIG.
VINCENT T. ELKIND.

No references cited.